United States Patent [19]
Davis

[11] Patent Number: 5,496,210
[45] Date of Patent: Mar. 5, 1996

[54] CONVEYORIZED WING PORTIONING SYSTEM

[76] Inventor: James F. Davis, 11976 Bells Ferry Rd., Canton, Ga. 30114

[21] Appl. No.: 183,191

[22] Filed: Jan. 18, 1994

[51] Int. Cl.⁶ ................................................. A22C 21/00
[52] U.S. Cl. ............................................................ 452/169
[58] Field of Search ................................... 452/169, 166, 452/170

[56] References Cited

U.S. PATENT DOCUMENTS

| | | | |
|---|---|---|---|
| 4,207,653 | 6/1980 | Gasbarro | 452/169 |
| 4,385,419 | 5/1983 | Cantrell | 452/169 |
| 4,562,613 | 1/1986 | Lewis | 452/169 |
| 4,769,872 | 9/1988 | Hazenbroek et al. | 452/169 |
| 4,935,990 | 6/1990 | Linnenbank | 452/169 |

FOREIGN PATENT DOCUMENTS

| | | | |
|---|---|---|---|
| 312881 | 4/1989 | European Pat. Off. | 452/169 |
| 8302495 | 2/1985 | Netherlands | 452/169 |
| 8400162 | 8/1985 | Netherlands | 452/169 |

*Primary Examiner*—Willis Little
*Attorney, Agent, or Firm*—Louis T. Isaf; R. Steven Coursey

[57] ABSTRACT

An automatic, poultry wing portioning system that employs a linear path throughout the entire portioning process. The system portions the wings into their constituent parts by moving the wings, supported by uniquely designed carriers, via conveyor into engagement with a series of adjustably mounted, stationary knives that depend from an overhead support frame into the linear path of the wings. The knives are displaced laterally and longitudinally from one another and are oriented with their sharp edges facing upward to slice through the soft tissues of each wing joint. By virtue of their adjustable mounting and the interplay of the knives with the other components of the system, the knives are capable of being independently positioned in numerous vertical planes and at various depths of penetration in relation to a plurality of grooves defined by each carrier. In addition to including adjustably mounted knives, the system includes adjustably mounted guide bars that position and restrain the wings, and wing portions, at the proper time during processing to insure proper separation of the wing parts. Such adjustment capabilities enable the system to easily accommodate different sizes of wings while maintaining a high product yield.

24 Claims, 13 Drawing Sheets

CONVEYORIZED WING PORTIONING SYSTEM

BACKGROUND OF THE INVENTION

The present invention relates generally to the field of poultry processing and, in its most preferred embodiments, to the field of apparatus and methods for portioning poultry wings.

Chicken wings, marketed under names including "buffalo wings" and "hot wings", have become a popular appetizer and snack food at many bars and restaurants. In preparing "buffalo wings", "hot wings", and the like, an entire wing is first removed from the body of the chicken at the first major joint. Next, the portion of the wing between the first and second major joints, known as a "drumette", is severed from the remainder of the wing by cutting through the second major joint. Then, by cutting through the wing's third major joint, the portion of the wing between the second and third major joints, known as the "flat", is separated from the remaining portion of the wing, known as the "tip". The "drumette" and "flat" are subsequently cooked in specially prepared sauces to produce "buffalo wings", "hot wings", and the like, while the "tip" is discarded or used for other purposes.

The portioning of chicken wings into "drumettes", "flats", and "tips" may be done manually by a worker using a sharp knife. However, manual portioning subjects the worker to the danger of being wounded by the knife. In addition, manual portioning is time consuming and too inefficient if a great number of wings must be separated into portions. Therefore, a number of attempts have been made to develop automatic portioning machines, including the machine described in U.S. Pat. No. 4,207,653 issued to Gasbarro.

Automatic portioning machines have met with mixed success. The automatic machines can portion a great number of wings in a given amount of time, but suffer from problems manifested by poor product quality and a subsequently high product discard rate. The underlying problems appear to arise from at least two sources. First, chicken wings vary in size from one wing to the next. Second, the existing machines (such as that of the Gasborro patent) do not readily allow for adjustments to accomodate size variations in wings. Thus, using an existing automatic portioning machine, a first wing may be properly portioned into a "drumette", "flat", and "tip" as the machine cuts cleanly through the second and third major joints of the wing. However, the same machine may miss the joints and cut through the bones of a second wing of a different size. Cutting the bones exposes the marrow and under present United States Department of Agriculture regulations, wing portions having exposed bone marrow are considered unfit for human consumption.

Attempts at providing adjustedable cutting assembly within the existing wing portioning machines have proven, for the most pan, to be difficult and insufficient. For example, due to the structural constraints of existing machines, adjustments to the cutting assemblies frequently result in the cutting blades frequently striking and cutting or shredding plastic of the plastic, restraining means that is often employed to hold the wings in position during portioning. United States Department of Agriculture regulations require that the restraining means be replaced whenever an inspector discovers a restraining means damaged in this way by excessive blade contact. Furthermore, since the restraining means often utilized in machines such as the Gasbarro machine is central to the machine and of one-piece, drum-like construction, a machine owner may incur significant costs associated with the virtual demolition and reconstruction of the entire machine necessary to replace the damaged restraining drum.

SUMMARY OF THE INVENTION

Briefly described, the present invention includes an automatic wing portioning system using a linear cutting path. In accordance with the preferred embodiment of the present invention, the linear cutting path is created by adjustably mounting a cutting blade in a first plane and by then moving poultry wings through the cutting zone of the blade in a plane perpendicular to that of the blade.

In the preferred embodiment of the apparatus of the present invention, two stationary knives are held in adjustable mountings connected to an overhead support frame. The knives extend downward in a vertical plane and into the cutting zone of the apparatus. By virtue of the adjustable mounting and the interplay of the knives with the other components of the apparatus, the knives are capable of being independently positioned in numerous vertical planes and of being twisted about their longitudinal axis to provide adjustability to accomodate different sizes of wings. Guide bars, also mounted to an overhead support frame, work in conjunction with guide blocks (also sometimes referred to hereafter as wing carriers) to restrain and guide wings properly into the knives.

A plurality of novel wing carriers are individually mounted on a table-top conveyor that is supported by a base and driven by a motor/drive assembly. Each wing carrier repetitively transports one poultry wing into the cutting zone of the apparatus. The unique shape of the wing carrier also restrains the wing (placed therein) while the second and third major joints of the wing are severed by the knives. A series of parallel, vertical grooves in each carrier allows the knives to pass through the wing carrier without touching or damaging the wing carrier.

In accordance with the preferred method of the present invention, the wing carrier and thereinsupported poultry wing are transported in linear fashion so that the wing comes into sequential contact with the series of guide bars and knives described previously. In accordance with the broadest aspect of the present invention, the wing portion is moved in a linear path through contact with each of the cutting blades, from beginning to completion of the respective cut. In accordance with the preferred embodiment of the present invention, the wing portion is moved through a linear path not only through contact with each blade, but also in its (the wing's) travel between the cutting blades. The wing carrier cooperates with each guide bar to move the poultry wing just enough to position and hold the joints of the wing in proper relationship to the plane of the knives for cutting. As the wing carrier moves, the poultry wing is sequentially pulled through each knife with the portions of the wing being cut free from one another and falling into collection chutes. The knife blades are capable of being slightly deflected by the heavier bones of the wing joints such that, if, by chance, the poultry wing is not perfectly positioned for cutting by the guide bars and wing carrier, each knife blade deflects slightly in a effort to pass through the appropriate joint without cutting into the bones and exposing bone marrow.

Accordingly, it is an object of the present invention is to provide an automatic wing portioning system to produce a higher yield of consumable wing portions than existing manual methods or automatic wing portioning machines.

Another object of the present invention is to provide an automatic wing portioning system to provide easy adjustment for accommodation of wings of different sizes. Still another object of the present invention is to provide an automatic wing portioning system to minimize knife contact with the wing restraining means.

Still another object of the present invention is to provide an automatic wing portioning system to allow the use of wing restraining means that are replaced independently of other wing restraining means when replacement becomes necessary.

Still another object of the present invention is to provide an automatic wing portioning system to allow knives to be easily replaced when necessary.

Other objects, features, and advantages of the present invention will become apparent upon reading and understanding the present specification, with the referenced patent specification, when taken in conjunction with the appended drawings.

DETAILED DESCRIPTION OF THE DRAWINGS

Figure 1:
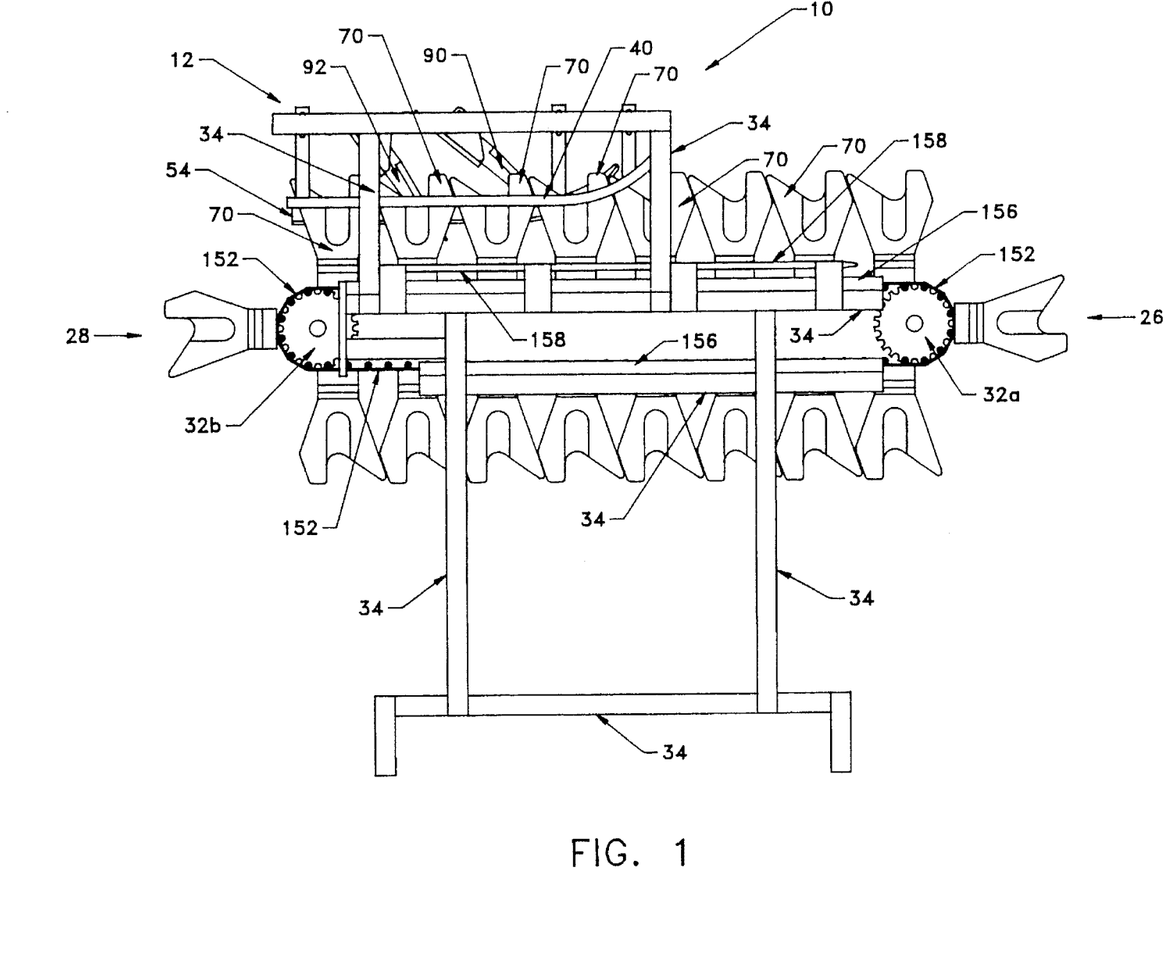
FIG. 1 is a side, elevational view of the wing portioning apparatus in accordance with the preferred embodiment of the present invention.

Referring now in greater detail to the drawings, in which like numerals represent like components throughout the several views, FIG. 1 displays a side, elevational view of a conveyorized wing portioning apparatus 10 constructed in accordance with the preferred embodiment of the present invention. The wing portioning apparatus 10 includes an overhead support frame 12 extending over a plurality of wing carriers 70. The overhead support frame 12, more clearly shown in FIGS. 2 and 3, has a generally, rectangular shape constructed from tubular steel members 24a,b,c,d that form sides 16, 18, and ends 20, 22, respectively.

Figure 2:
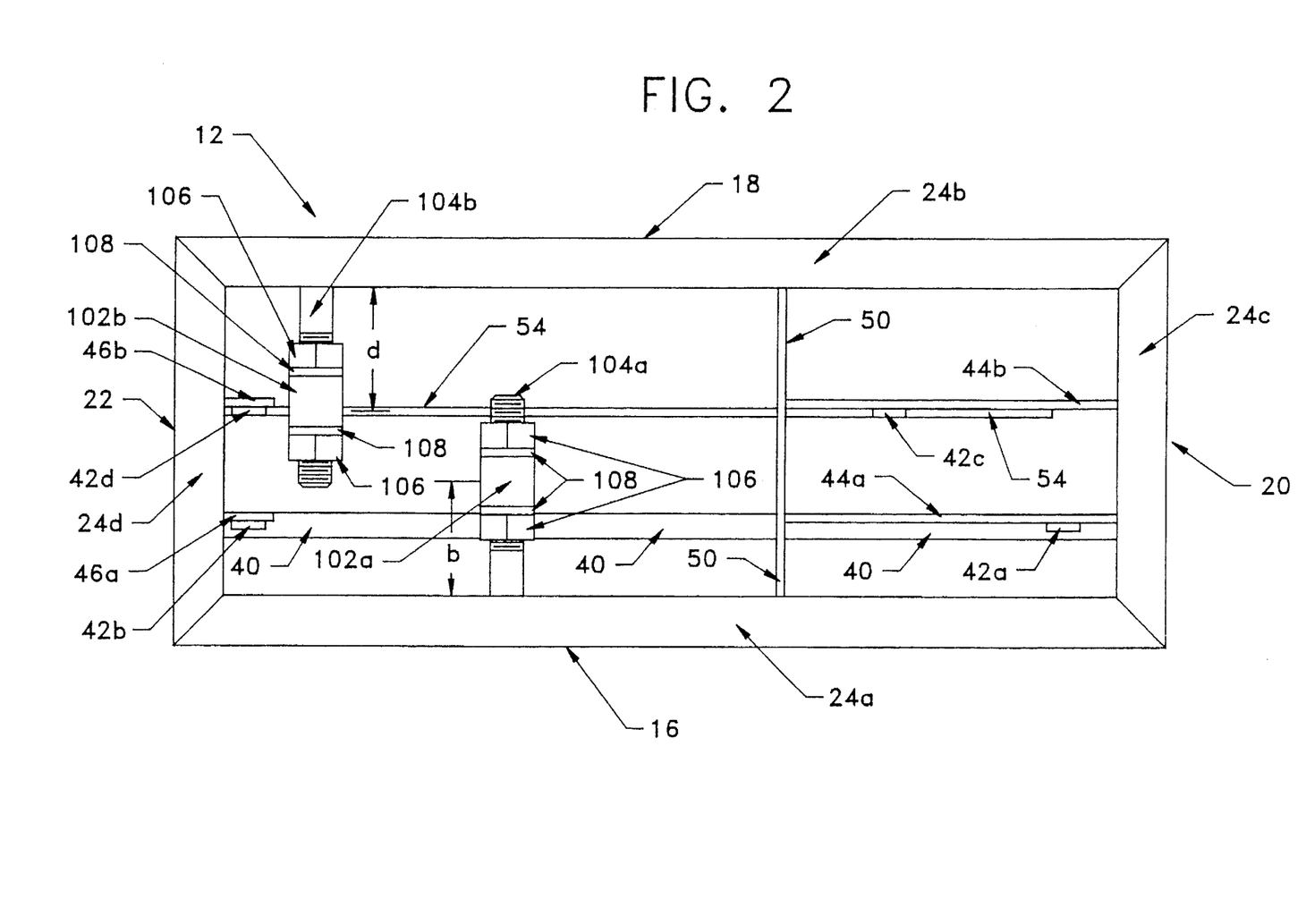
FIG. 2 is a top view of the overhead support frame of the wing portioning apparatus of FIG. 1.
Figure 3:
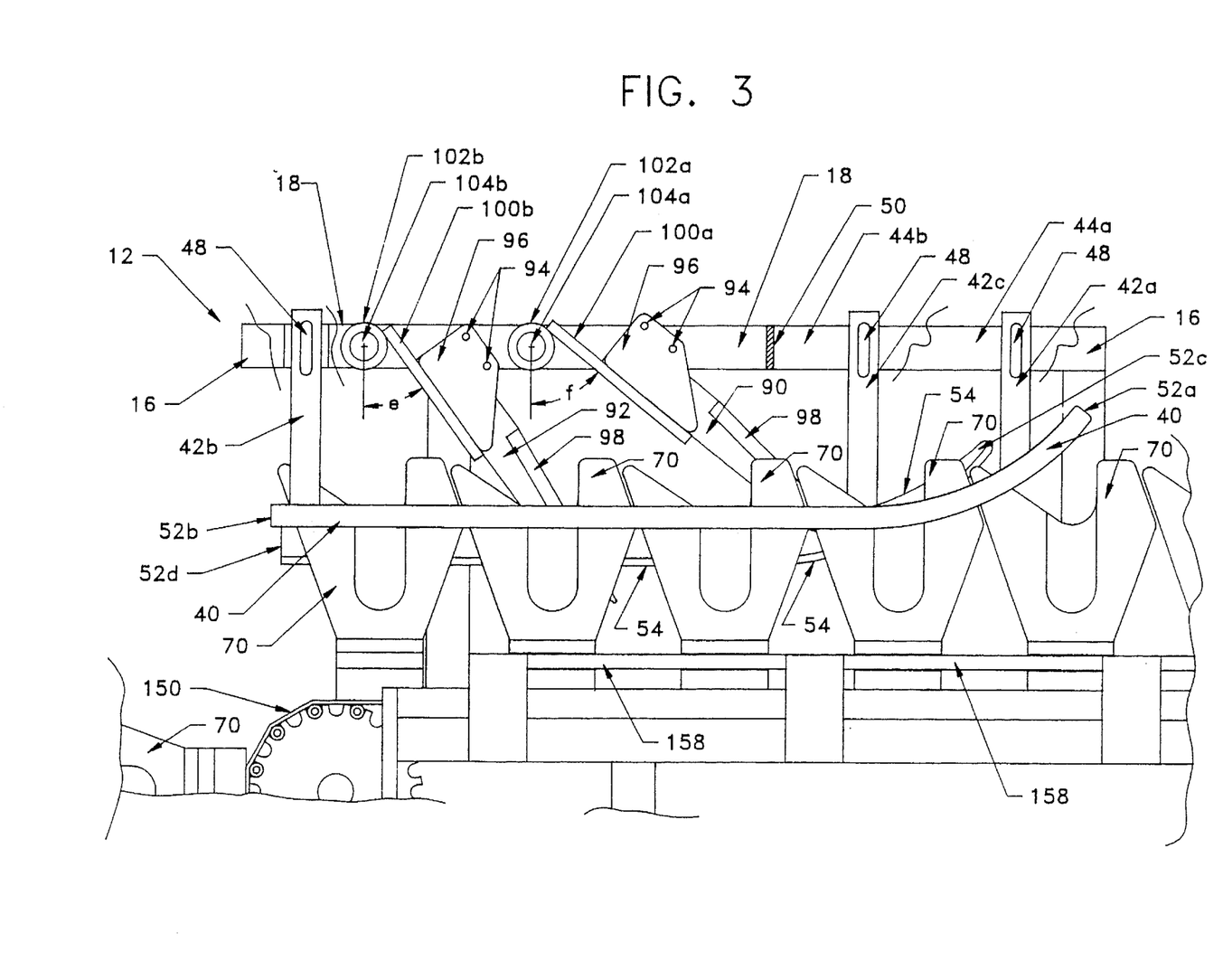
FIG. 3 is an exploded, side, elevational view of the overhead support frame of the wing portioning apparatus of FIG. 1 where some tubular steel is cut-away to expose the desired detail.

In accordance with the preferred embodiment of the present invention, FIG. 3 displays a round guide bar 40 that extends alongside the wing careers 70 and is suspended from the overhead support frame 12 by guide bar hangers 42a,b, T-leg 44a, (FIG. 2) and hanger mount 46a (FIG. 2). Referring to FIG. 2, T-leg 44a is rigidly held in place, for example, by welding to tubular steel member 24c and T-top 50, while hanger mount 46a is rigidly attached for example, by welding to tubular steel member 24d. T-top 50 is rigidly fixed, for example, by welding and extends between tubular steel members 24a,b. The slots 48 in guide bar hangers 42a,b (FIG. 3) work in cooperation with T-leg 44a and hanger mount 46a, respectively, to allow the vertical locations of guide bar ends 52a, b (relative to the moving conveyor top 150) to be adjusted to accomodate different sizes of wings 160 (FIG. 4).

Figure 4:
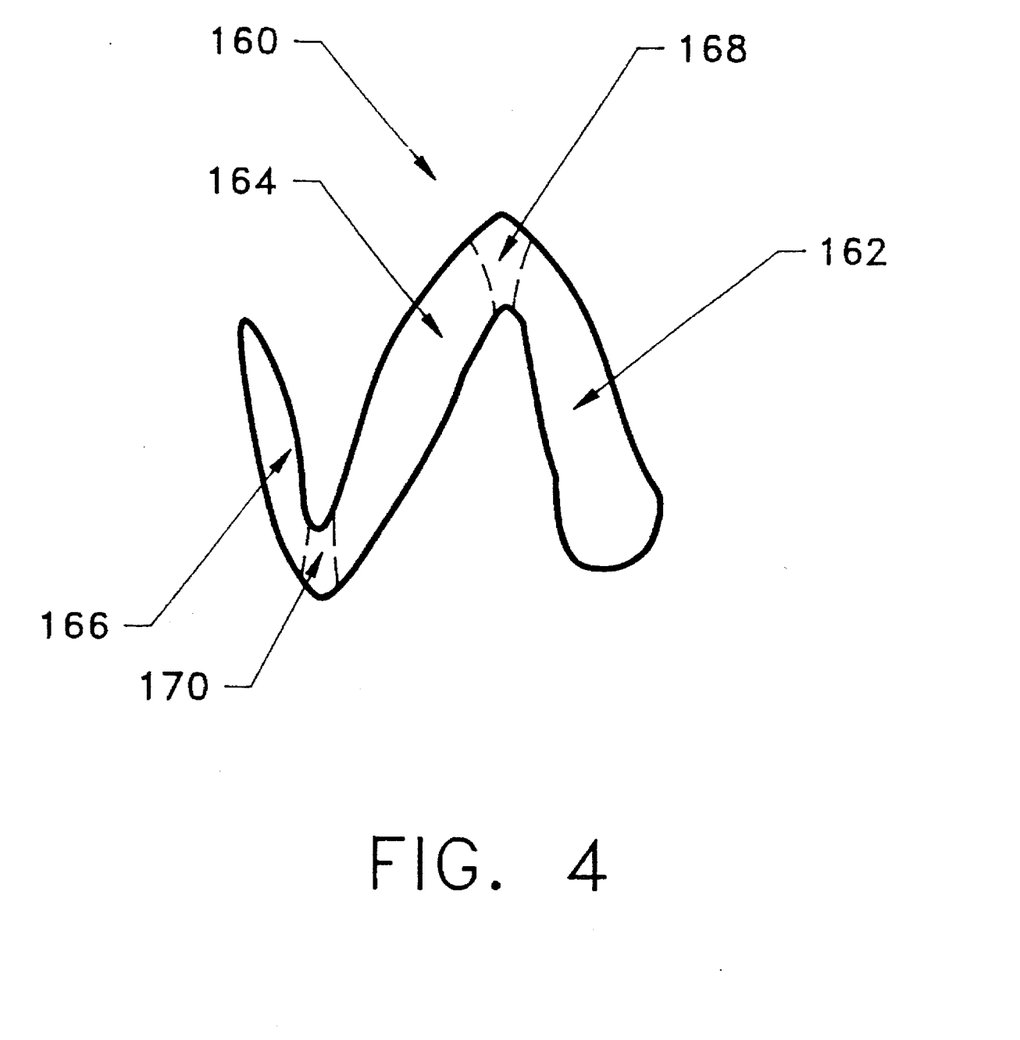
FIG. 4 is a pictorial view of a chicken wing.

FIGS. 2 and 3 also display a flat guide bar 54 that contacts the flat 164 and tip 166 portions of a wing 160 (FIG. 4). The flat guide bar 54 extends into the second groove 74 (FIG. 5) of the wing careers 70 as they travel along the moving conveyor top 150. The flat guide bar 54 is suspended from the overhead support frame 12, in the same way that round guide bar 40 is suspended, by guide bar hangers 42c,d, T-leg 44b, and hanger mount 46b. T-leg 44b is rigidly fixed in place, for example, by welding to tubular steel member 24c and T-top 50, while hanger mount 46b is rigidly attached, for example, by welding to tubular steel member 24d. The slots 48 in guide bar hangers 42c,d work cooperatively with T-leg 44b and hanger mount 46b, respectively, to allow adjustment of the vertical locations of guide bar ends 52c,d to accomodate different sizes of wings 160 (FIG. 4).

Figure 5:
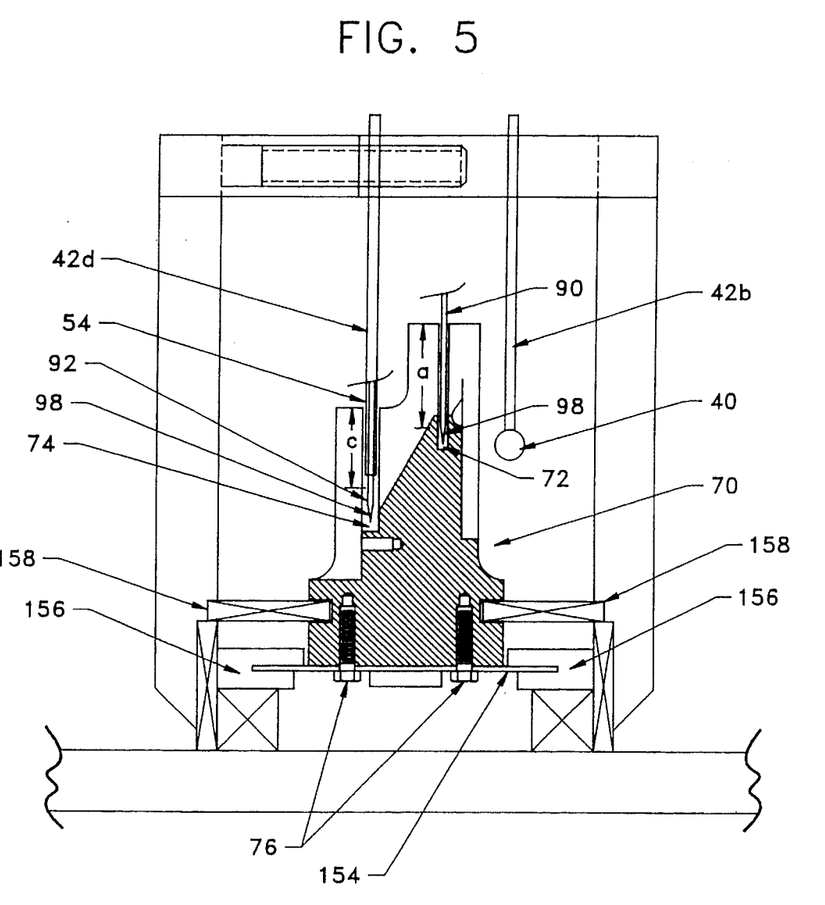
FIG. 5 is a end view from the drive end of the wing portioning apparatus of FIG. 1 showing a wing carrier in cross-section on the moving conveyor top, and showing certain components removed for clarity.

As shown in FIG. 3, a first knife 90 is adjustably held in place by pinch screws 94 that extend through a sleeve 96 and contact the portion (hidden from view) of the knife 90 enclosed by sleeve 96. The knife 90 extends downward in a vertical plane from the sleeve 96 so that its sharp edge 98 resides partially in the first groove 72 defined by each wing carrier 70 (FIG. 5). In accordance with the preferred method of the present invention the sharp edge 98 of the knife 90 is oriented so that it severs the second major joint 168 (FIG. 4) of each wing 160 (FIG. 4) as described below. Note that the depth of penetration "a" of the sharp edge 98 into the first groove 72 (FIG. 5) is set by first loosening the pinch screws 94 and sliding the knife 90 further into or out of sleeve 96. Then, the pinch screws 94 are retightened to re-secure the knife 90. Also note that the combination of tightening some of the pinch screws 94, while loosening other pinch screws 94, twists the knife 90 about its longitudinal axis and thereby, causes the knife 90 to be adjusted into a slightly different relationship with the wings 160. Such adjustments may be necessary when setting the wing portioning apparatus 10 to process a different size wing 160 (FIG. 4). The "longitudinal axis of the knife" should be understood by those reasonably skilled in the art to refer to an imaginary line extending from one end of knife 90, through its center, to the opposite end of the knife 90.

The horizontal location of knife 90, "b", is measured from the inside surface 30 of tubular steel member 24a as shown in FIG. 2. In accordance with the preferred embodiment of the present invention, the horizontal location of the knife 90 is adjustable, to accomodate different sizes of wing 160, through the cooperation of mounting plate 100a (FIG. 3), set collar 102a, threaded post 104a, nuts 106, and washers 108. Mounting plate 100a is rigidly attached, for example, by welding to sleeve 96 and to set collar 102a as shown in FIG. 3. Since the knife 90 is held in place by the sleeve 96 and the set collar 102a attached to the sleeve 96, the horizontal position of the knife 90 is changed by sliding the set collar 102a along the threaded post 104a and in the process, moving the mounting plate 100a, the sleeve 96, and hence, the knife 90. Threaded post 104a is rigidly attached, for example, by welding to the inside surface 30 of the tubular steel member 24a (FIG. 2). Sliding of the set collar 102a is accomplished by first backing the nuts 106 and washers 108 away from the set collar 102a. The set collar 102a is then moved along the threaded post 104a until the desired position is reached. Finally, the nuts 106 and washers 108 are snugged up against the set collar 102a to secure it from moving due to vibration and other causes.

Figure 6:
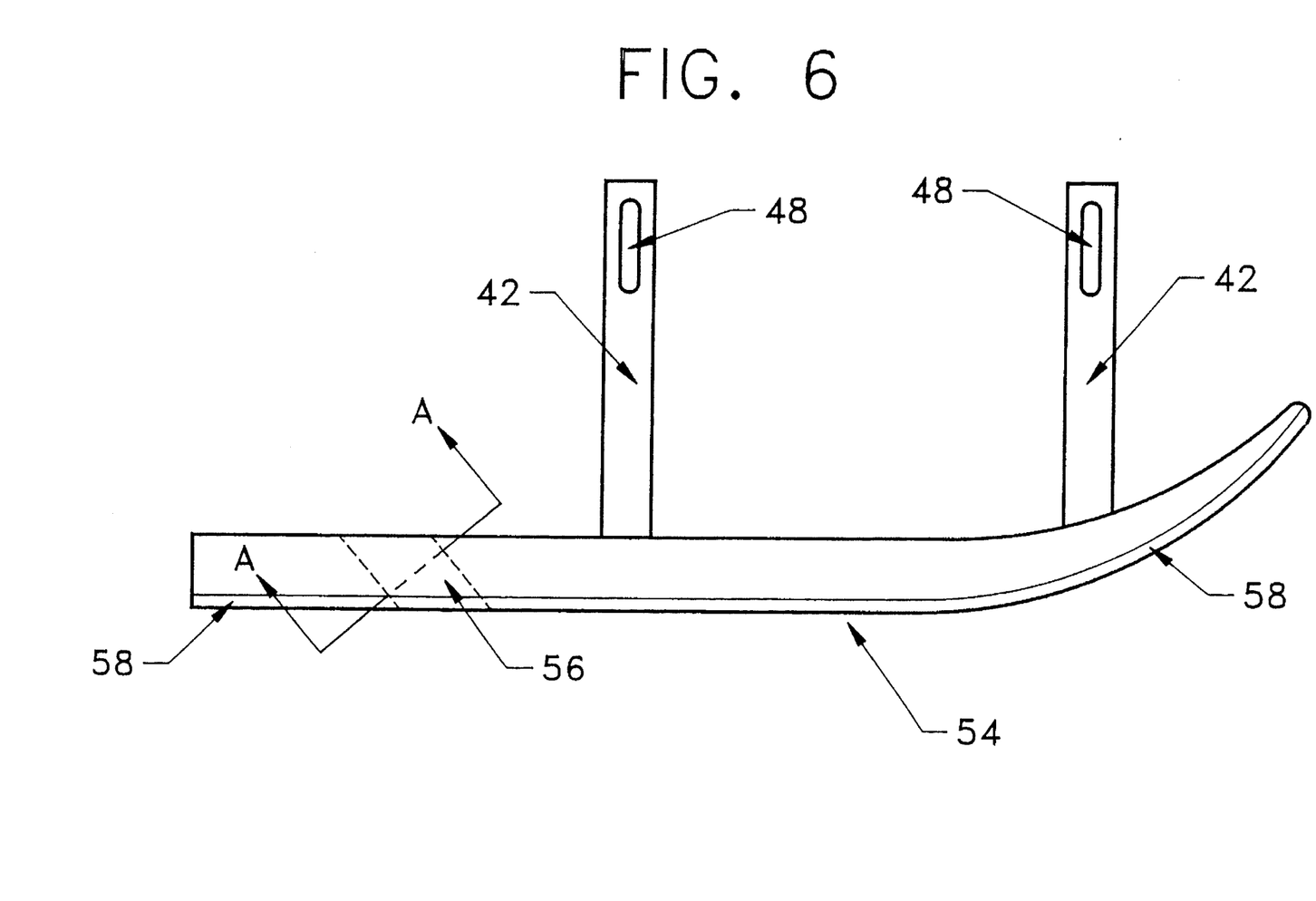
FIG. 6 is a side view of the flat guide bar.
Figure 7:
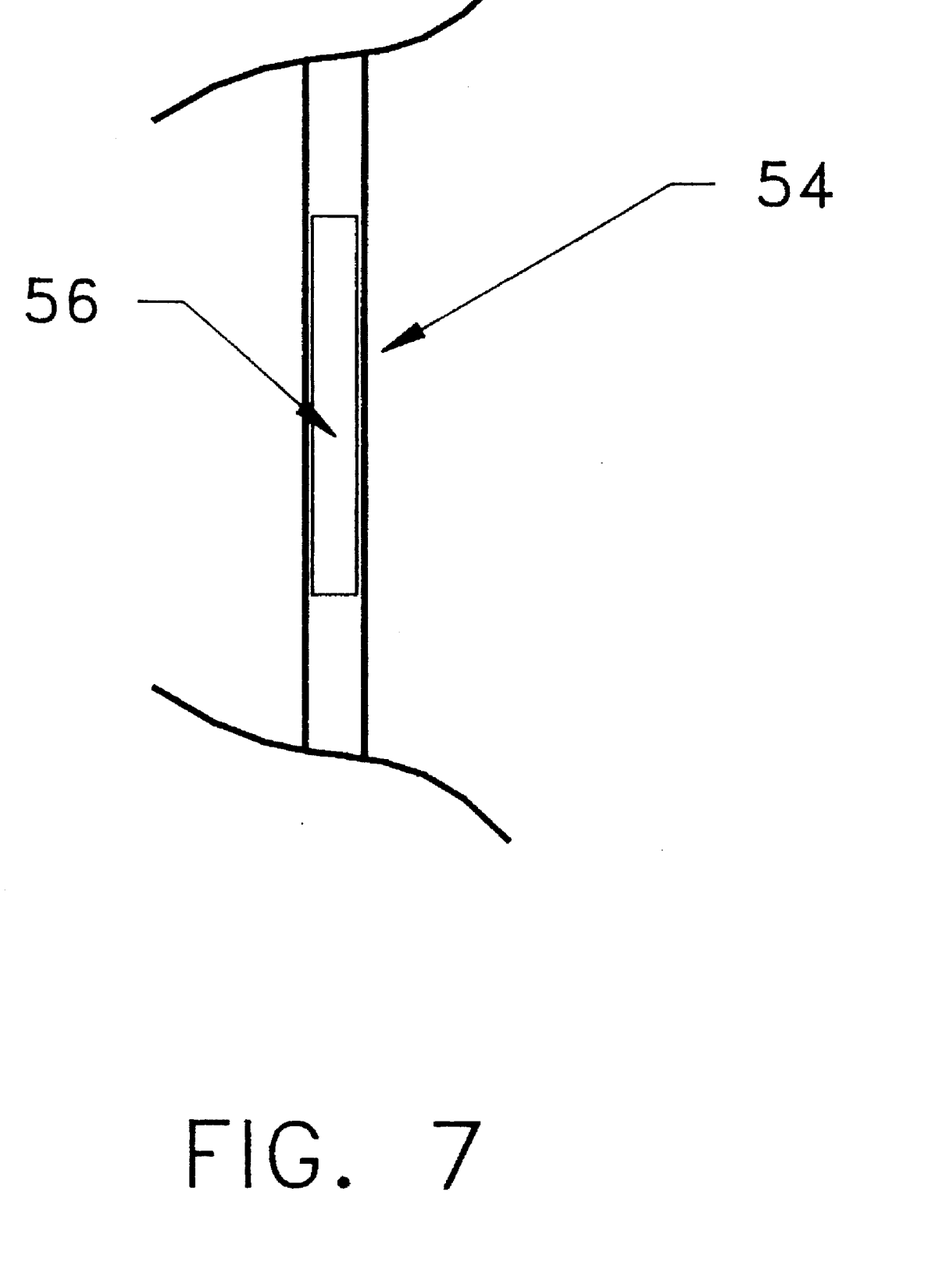
FIG. 7 is a sectional view taken along line A—A in FIG. 6.

A second knife 92 is adjustably held in place like tint knife 90. As shown in FIG. 3, the pinch screws 94 extend through the sleeve 96 and contact the portion (hidden from view) of the knife 92 enclosed by sleeve 96. The knife 92 extends downward in a vertical plane from the sleeve 96 so that its sharp edge passes through the slot 56 in the flat guide bar 54 (FIGS. 6,7) before entering and partially residing in the second groove 74 defined by each wing carrier 70 (FIG. 5). In accordance with the preferred method of the present invention, the sharp edge 98 of the knife 92 is oriented so that it severs the third major joint 170 (FIG. 4) of each wing 160 as described below. The depth of penetration "c" of the sharp edge 98 into the second groove 74 (FIG. 5) is set by first loosening the pinch screws 94 and sliding the knife 92 further into or out of sleeve 96. Then, the pinch screws 94 are retightened to resecure the knife 92. Also, note that tightening some of the pinch screws 94, while loosening other pinch screws 94, twists the knife 92 about its longitudinal axis (discussed above in reference to knife 90) and thereby, causes the knife 92 to be adjusted into a slightly different relationship with the wings 160. Such adjustments may be necessary when setting the wing portioning apparatus 10 to process a different size wing 160 (FIG. 4).

Similarly to knife 90, the horizontal location of knife 92, "d", is measured from the inside surface 30 of tubular steel member 24b as shown in FIG. 2. In accordance with the preferred embodiment of the present invention, the horizontal location of the knife 92 is adjustable, to accomodate different sizes of wing 160 (FIG.4), through the cooperation of mounting plate 100b (FIG. 3), set collar 102b, threaded post 104b. nuts 106, and washers 108. Mounting plate 100b is rigidly attached, for example, by welding to sleeve 96 and to set collar 102b as shown in FIG. 3. Since the knife 92 is held in place by the sleeve 96 and the set collar 102b attached to the sleeve 96, the horizontal position of the knife 92 is changed by sliding the set collar 102b along the threaded post 104b and in the process, moving the mounting plate 100b, the sleeve 96, and hence, the knife 92. Threaded post 104b is rigidly attached, for example, by welding to the inside surface 30 of tubular steel member 24b (FIG. 2). Sliding of the set collar 102b is accomplished by first backing the nuts 106 and washers 108 away from the set collar 102b. The set collar 102b is then moved along the threaded post 104b until the desired position is reached. Finally, the nuts 106 and washers 108 are snugged up against the set collar 102b to secure it. With reference to FIG. 3, the angular portion (see angles "e" and "f") if each knife 90, 92 is, also, adjusted through the respective set collar and past assemblies 102a,b, 104a,b.

Figure 8:
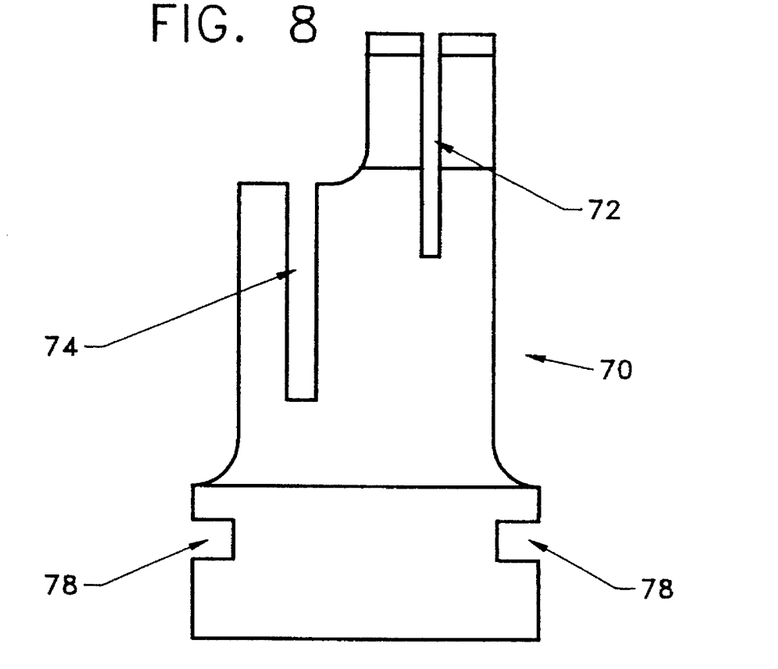
FIG. 8 is a front view of a wing carrier.
Figure 9:
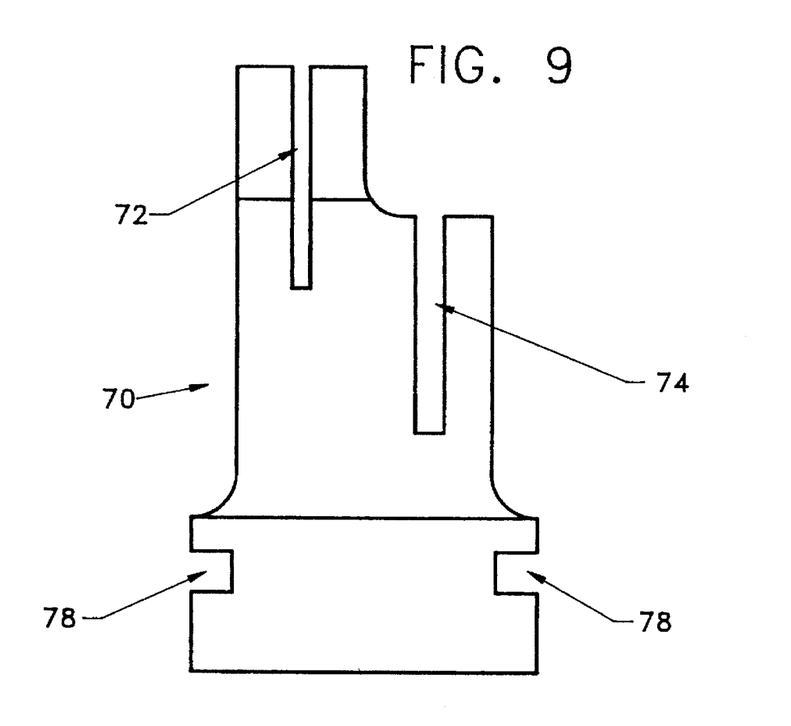
FIG. 9 is a rear view of a wing carrier.

In accordance with the preferred embodiment of the present invention, each wing carrier 70 is removably connected to a link 154 of a conveyor chain 152 (FIG. 1) by bolts 76 as shown in FIG. 5. The links 154 of the conveyor chain 152 (FIG. 1) are guided by wear strips 156 as the conveyor chain 152 (FIG. 1) traverses its elliptical path as discussed below. Each wing carrier 70 has stabilizing slots 78 (FIGS. 8, 9) into which the stabilizing bars 158 fit to limit any tendency of the wing carrier 70 to tip over while the knives 90. 92 are severing the joints 168, 170 of the wing 160 (FIG. 4). FIG. 5 also shows, in more detail, the spatial relationship of a number of components to the wing carrier 70. First, the relationship of the round bar guide 40 is shown as it is suspended by guide bar hanger 42b alongside the wing career 70. Second, the partial residence of the first knife 90 in the first groove 72 is illustrated. Third, the second knife 92 is displayed as it partially resides in the second groove 74 after passing through the slot 56 (FIG. 7) and tapered lower edge 58 (FIG. 7) of the flat guide bar 54. The guide bar hanger 42d is also shown as it extends downward from its hanger mount 46b (FIG. 2).

Referring back to FIG. 1, the wing portioning apparatus 10 is supported by a tubular steel frame 34 to which the overhead support frame 12 is rigidly attached, for example, by welding. The tubular steel frame also supports wear strips 156 which guide the conveyor chain 152 as it traverses an elliptical path that takes it around sprockets 32a,b located, respectively, at the loading end 26 and the drive end 28. The sprockets 32a,b are mounted to the tubular steel frame 34 by use of conventional shafts and beatings that are not shown to avoid confusion. For the same reason, the conventional motor and drive assembly connected to sprocket 32b are not shown. The location of the conventional shafts, bearings, motor and drive assembly should be readily understood by one reasonably skilled in the art.

Figure 10:
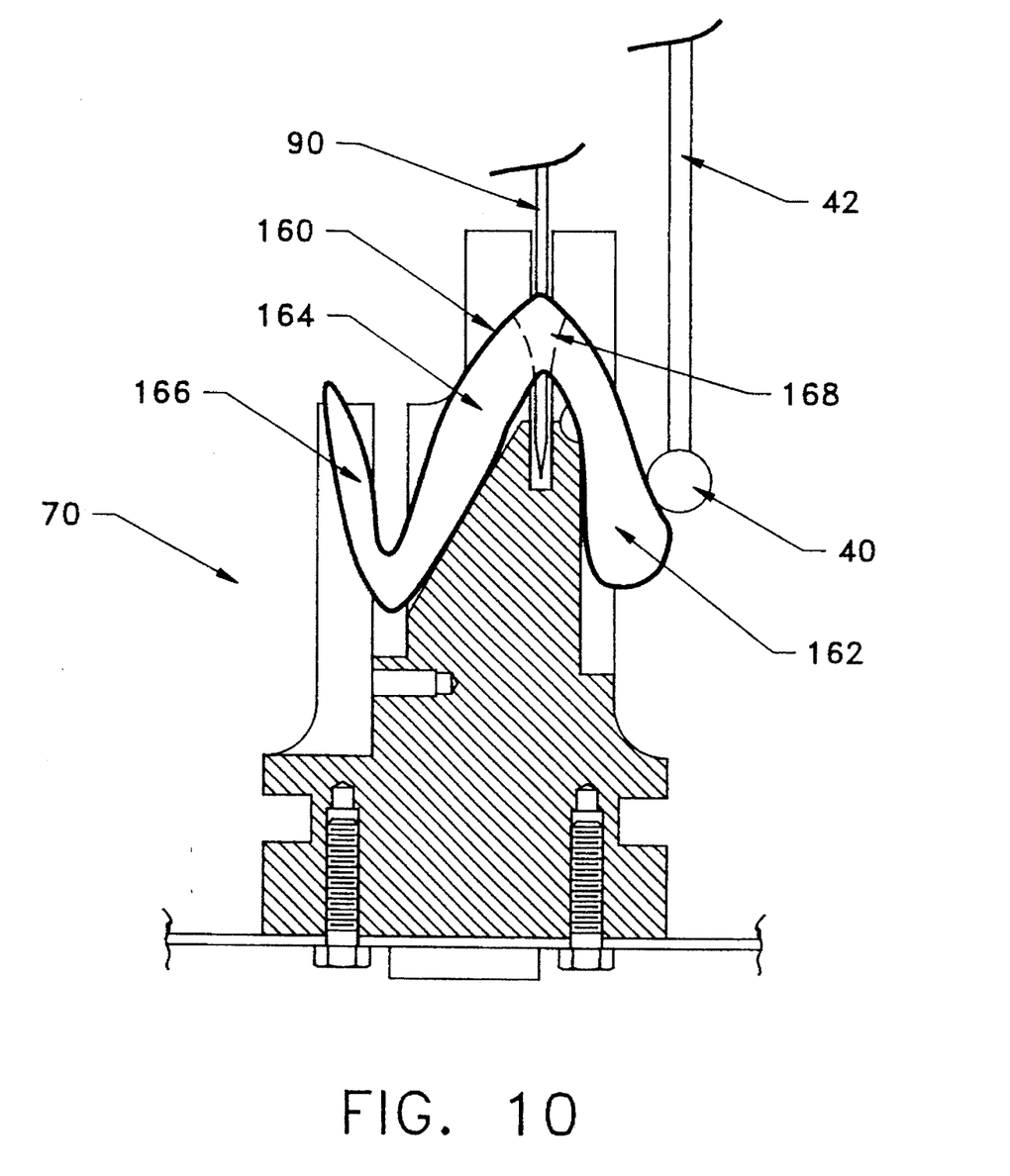
FIG. 10 is a cross-sectional view of a wing carrier showing the round guide bar contacting the drumette portion of a wing as the wing carrier approaches the first knife.
Figure 11:
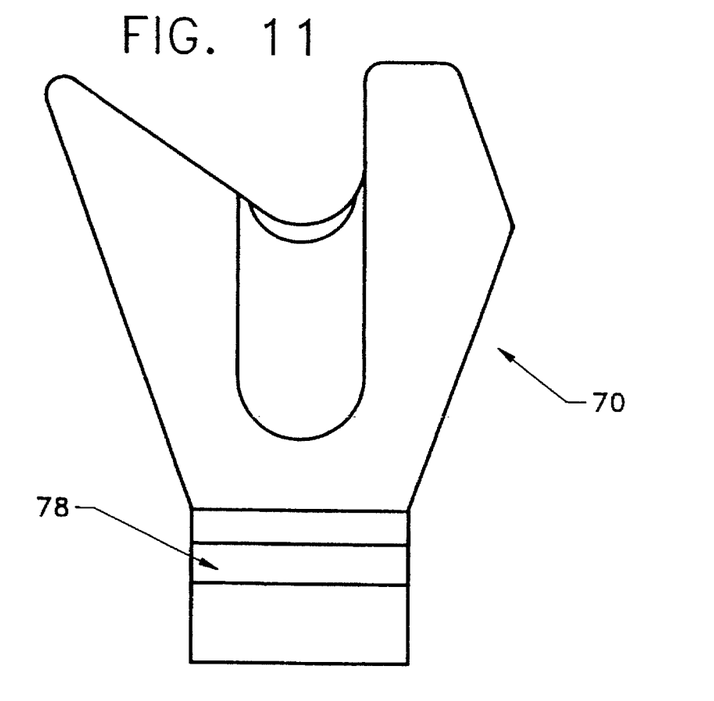
FIG. 11 is a right side, elevational view of a wing carrier.
Figure 12:
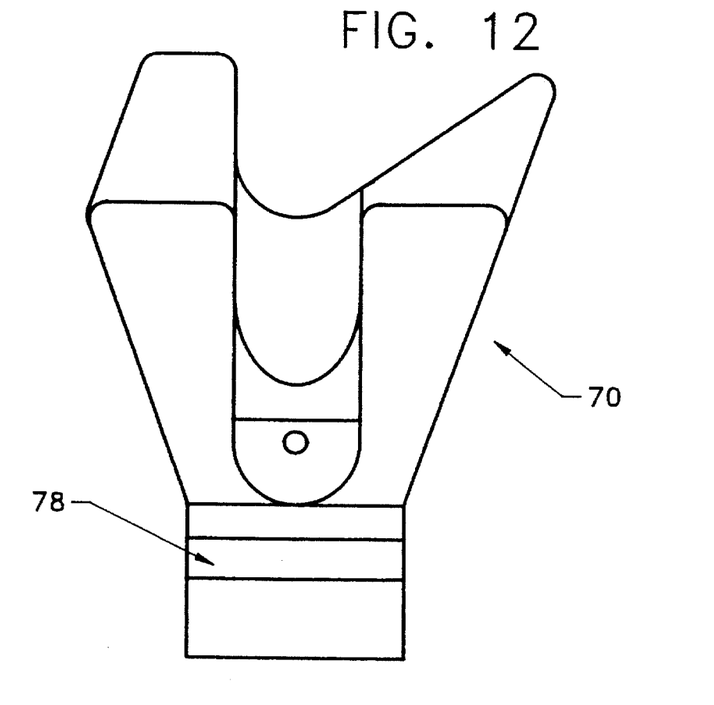
FIG. 12 is a side, elevational view of a wing carrier.
Figure 13:
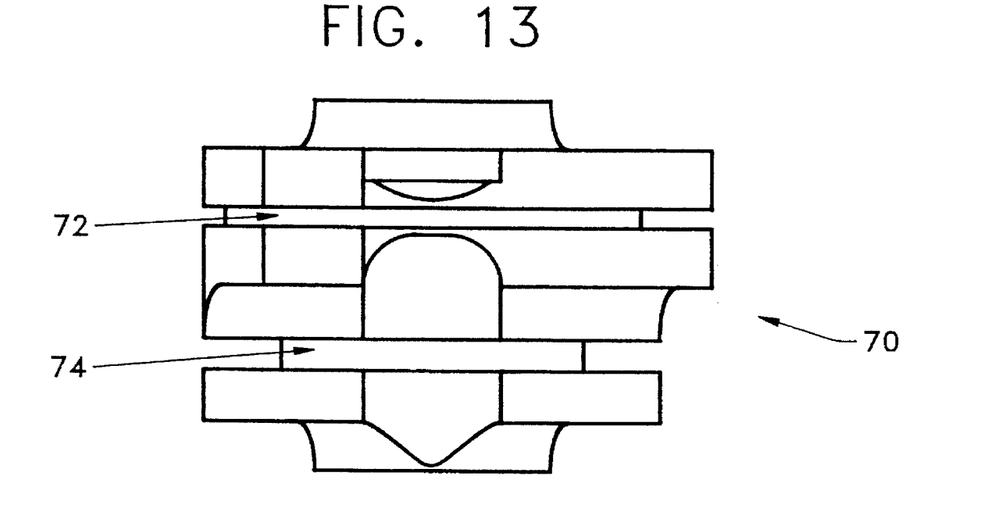
FIG. 13 is top view of a wing carrier.
Figure 14:
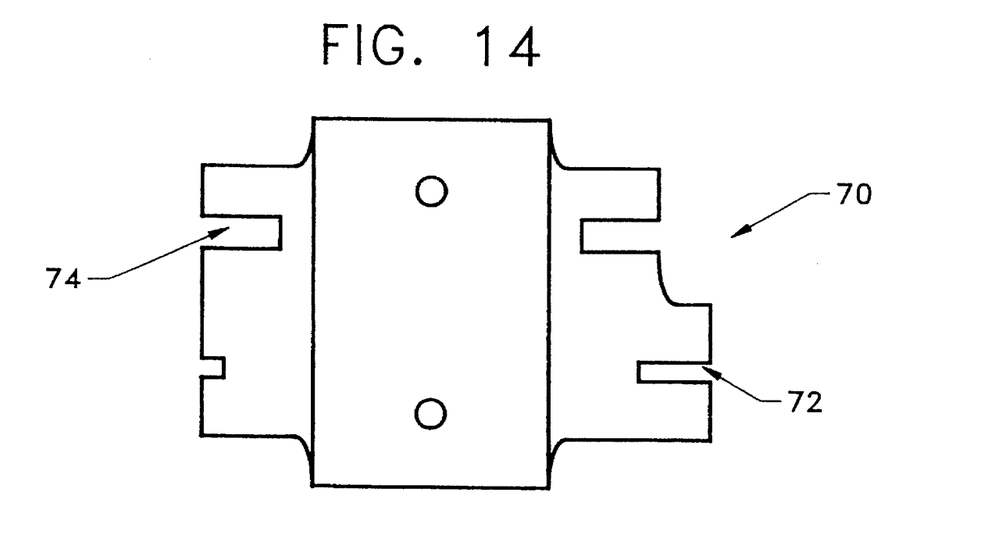
FIG. 14 is a bottom view of a wing carrier.
Figure 16:
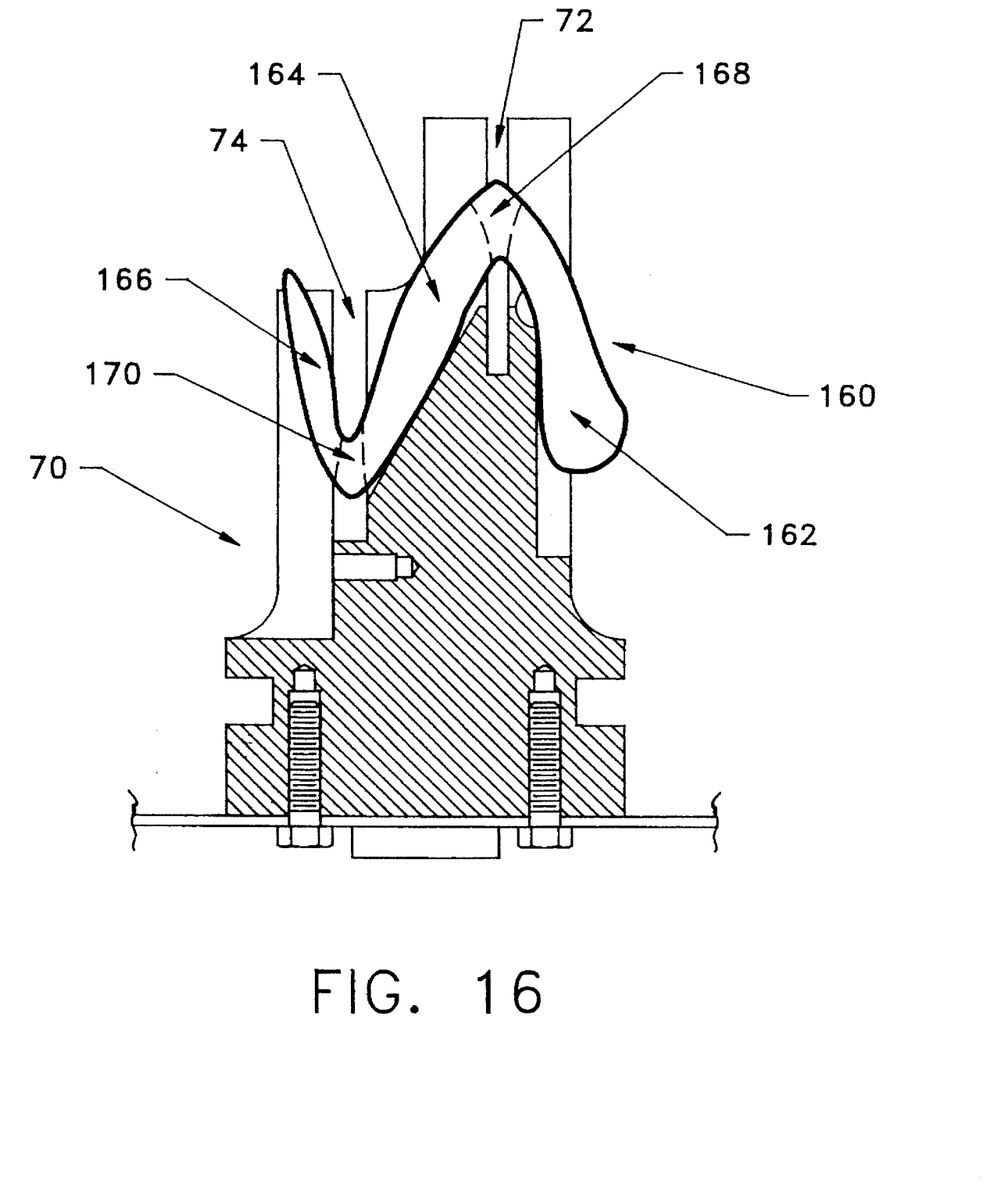
FIG. 16 cross-sectional view of a wing carrier showing a wing loaded onto the wing carrier.

In accordance with the preferred method of the present invention, the conveyor chain 152 moves through its elliptical path when electrical power is supplied to the motor (not shown). Refer first to FIG. 1. The conveyor chain 152 forms a moving conveyor top 150 as it travels from the loading end 26 toward the drive end 28. A worker, standing at the loading end 26, places wings 160 (FIG. 4) on each empty wing carrier 70 as depicted in FIG. 16. As the loaded wing carriers 70 approach the first knife 90, the round guide bar 40 comes into contact with the drumette 162 (FIG. 4) of the wing 160 (FIG. 4) as shown in FIG. 10. After contacting the drumette 162 (FIG. 4), the round guide bar 40 applies increasing pressure to the drumette 162 as the wing carrier 70 approaches the first knife 90. The round guide bar 40 and wing carrier 70 restrain the drumette 162, but allow it to move slightly. Acting in combination, the shape of the wing carrier 70 (FIGS. 8, 9, 11, 12, 13, 14) and the round guide bar 40 position the second major joint 168 of the wing 160 above the first groove 72 of the wing carrier 70. Continued movement of the wing carrier 70 toward the drive end 28 (FIG. 1), causes the first knife 90 to pass through the first groove 72 of the wing carrier 70 thereby, severing the second major joint 168 of the wing 160. If, for some reason, the first knife 90 is not exactly aligned with the second major joint 168, the round guide bar 40 allows the drumette 162 to move slightly to improve the alignment. In addition, the knife 90 deflects slightly to assist passage of the knife 90 cleanly through the second joint 168 and not through the bones of the drumette 162 or flat 164.

Figure 15:
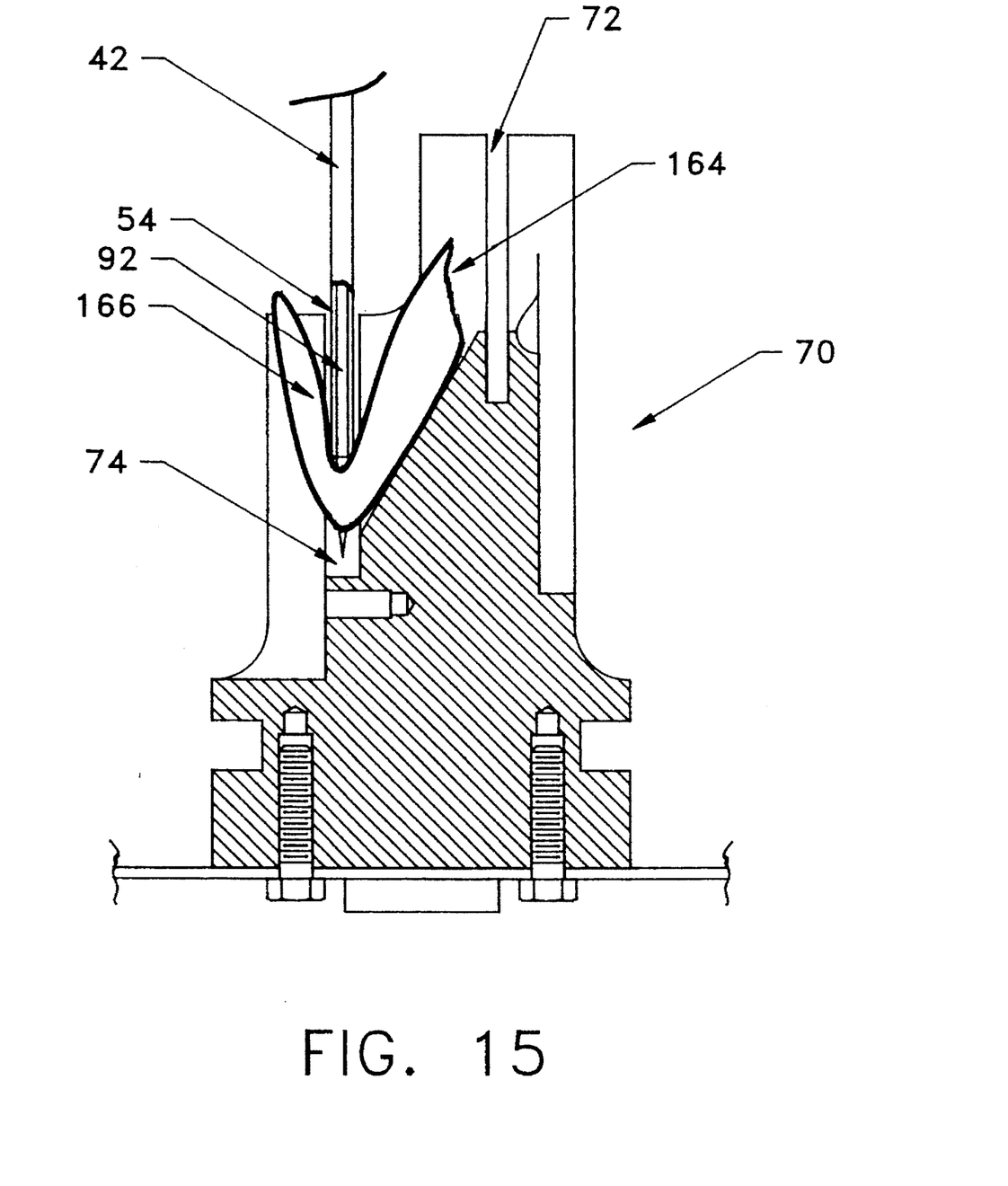
FIG. 15 is a cross-sectional view of a wing carrier showing the flat guide bar contacting the flat and tip portions of a wing as the wing carrier approaches the second knife.

Once the second major joint 168 is severed, the flat 164 and tip 166 are free to move relative to the drumette 162 as the wing carrier 70 continues to move toward the drive end 28 and the second knife 92 of the wing portioning apparatus 10. FIG. 15 displays the wing carrier 70 as it approaches the second knife 92. Note that the tapered lower edge 58 of the flat guide bar 54 begins (at the curved leading sections of the bar 54) to come into contact with the flat 164, tip 166, and third major joint 170 of the wing 160. After making initial contact, advancement of the wing career 70 by the moving conveyor top 150 (FIG. 1) causes the flat guide bar 54 to increase its pressure on the remaining portions of the wing 160. The flat guide bar 54 and the wing earner 70 restrain the flat 164, tip 166, and third major joint 170, yet allow them to move slightly. The flat guide bar 54 also positions the third joint 170 above the second groove 74 in the wing carrier 70. As the wing carrier 70 continues to move toward drive end 28, the second knife 92 passes through the second groove in the wing carrier 70 and severs the third major joint 170 of the wing 160. If, for some reason, the second knife 92 is not exactly aligned with the third major joint 170, the flat guide bar 54 allows sufficient movement of the flat 164 and tip 166 to improve the alignment. Additionally, like the first knife 90, the second knife 92 deflects slightly to assist passage of the knife 92 cleanly through the third joint 170 and not through the bones of the flat 164 or tip 166.

As the drumette 162, flat 164, and tip 166 are cut apart by the knives 90, 92, they fall off the carrier and into collection chutes (not shown). The wing earners 70 continue their movement toward the drive end 28 of the wing portioning apparatus where they circle sprocket 32b and then return to the loading end 26. There, the wing carriers 70 are loaded with wings 160 and the preferred method of the present invention is repeated again.

Adjustments to the positions of the blades (for example, dimensions earlier discussed as "a", "b", "c", "d", "e", and "f" and "twist" about this horizontal axis) are, in accordance with a preferred operation, performed each time a new batch of similarly sized wing portions is to be intruduced to the machine thereby customzining the apparatus to wings of different sizes.

Whereas this invention has been described in detail with particular reference to a preferred embodiment, it will be understood that variations and modifications can be effected within the spirit and scope of the invention, as described herein before and as defined in the appended claims.

I claim:

1. An apparatus for separating the bones of poultry wing portions comprising:

a guide block including a wing saddle portion;
   a conveyor to which said guide block is attached;
   a drive means for moving said conveyor to direct said guide block through a linear path;
   an overhead support frame disposed above, at least, a portion of said linear path;
   a blade disposed within said linear path, said blade being ultimately supported by said overhead support frame;
   a blade adjustment means for adjusting the position of said blade relative to said guide block and wherein, said blade adjustment means is connected between said blade and said overhead support frame, whereby said blade adjustably depends into said linear path, and said blade adjustment means includes, at least,
      a sleeve partially enclosing a first portion of said blade and from which a second portion of said blade depends, and
      a blade retaining means for releasably retaining said first portion of said blade within said sleeve,
      whereby said first portion of said blade enclosed by said sleeve is adjusted by sliding said blade relative to said sleeve upon sufficient release of said blade retaining means, and
      whereby the depth of penetration of said blade relative to said guide block is adjusted; and
   an elongated guide bar adjustably suspended from said overhead support frame and extending within said linear path, whereby said elongated guide bar restrains and positions different sizes of poultry wings;
   whereby the wing portion of a bird supported on said wing saddle portion is moved along said linear path into engagement with said blade to effect separation of the wing portion;
   whereby the horizontal position and depth of penetration of said blade are adjustable relative to said guide block to adjustably effect cutting of the wing portion.

2. The apparatus of claim 1, wherein said blade retaining means includes, at least, a pinch screw.

3. The apparatus of claim 1, wherein said blade adjustment means further includes, at least,
   a lateral member extending from said overhead support frame, and
   an intermediate member adjustably positioned relative to said lateral member and connected between said lateral member and said sleeve, said sleeve being fixedly attached to said intermediate member,
   whereby the horizontal location of said blade relative to said guide block is adjusted by repositioning said intermediate member along said lateral member.

4. An apparatus for separating the bones of poultry wing portions comprising:

a guide block including a wing saddle portion;
   a conveyor to which said guide block is attached;
   a drive means for moving said conveyor to direct said guide block through a linear path;
   a first blade disposed within said linear path, said first blade being non-rotating;
   a second blade adjustably disposed within said linear path both laterally and longitudinally displaced from said first blade, said second blade being non-rotating;
   an overhead support frame disposed above, at least, a portion of said linear path, said first blade ultimately being supported by said overhead support frame;
   a first blade adjustment means for adjusting the position of said first blade relative to said guide block wherein, said first blade adjustment means is connected between said first blade and said overhead support frame, whereby said first blade adjustably depends into said linear path, and
   said first blade adjustment means includes, at least,
      a sleeve partially enclosing a first portion of said first blade and from which a second portion of said first blade depends, and
      a blade retaining means for releasably retaining said first portion of said first blade within said sleeve,
      whereby said first portion of said first blade enclosed by said sleeve is adjusted by sliding said first blade relative to said sleeve upon sufficient release of said blade retaining means, and
      whereby the depth of penetration of said first blade relative to said guide block is adjusted; and
   a second blade adjustment means for adjusting the position of said second blade relative to said guide block, wherein said second blade adjustment means includes, at least,
      a sleeve partially enclosing a first portion of said second blade and from which a second portion of said second blade depends, and a blade retaining means for releasably retaining said first portion of said second blade within said sleeve, whereby said first portion of said second blade enclosed by said sleeve is adjusted by sliding said second blade relative to said sleeve upon sufficient release of said blade retaining means, and whereby the depth of penetration of said second blade relative to said guide block is adjusted;

whereby the wing portion of a bird supported on said wing saddle portion is moved along said linear path into engagement with said first blade and said second blade to effect separation of the wing portion; and whereby the horizontal position and depth of penetration of said first blade and said second blade are adjustable relative to said guide block to adjustably effect cutting of the wing portion.

5. The apparatus of claim 4, wherein each said blade adjustment means includes, at least, a lateral member extending from said overhead support frame, and an intermediate member adjustably positioned relative to said lateral member and connected between said lateral member and said sleeve, said sleeve being fixedly attached to said intermediate member, whereby the horizontal location of each said blade relative to said guide block is adjusted by repositioning said intermediate member along said lateral member.

6. The apparatus of claim 5, wherein said apparatus further includes, at least, an elongated guide bar adjustably suspended from said overhead support frame and extending within said linear path, said elongated guide bar being adjustable relative to said guide block, whereby restraining and positioning of different sizes of poultry wings is effected.

7. An apparatus for separating the bones of poultry wing portions comprising:

a guide block including a wing saddle portion, said guide block further including, at least, a groove formed therein;

a conveyor to which said guide block is attached;

a drive means for moving said conveyor to direct said guide block through a linear path;

a first blade disposed within said linear path;

a second blade adjustably disposed within said linear path both laterally and longitudinally displaced from said first blade;

an overhead support frame disposed above, at least, a portion of said linear path, said first blade ultimately being supported by said overhead support frame; and an elongated guide bar adjustably suspended from said overhead support frame and extending within said linear path partially into said groove of said guide block wherein, said elongated guide bar is adjustable relative to said guide block, said elongated guide bar defines a blade passage, and said first blade extends through said blade passage to depend partially into said groove of said guide block, whereby said elongated guide bar restrains and positions different sizes of poultry portions for cutting apart by said first blade.

8. The apparatus of claim 7 wherein, said elongated guide bar is a first elongated guide bar, and said apparatus further includes, at least, a second elongated guide bar extending within said linear path adjacent said guide block.

9. The apparatus of claim 8, wherein each said elongated guide bar has a curved leading section.

10. The apparatus of claim 9, wherein said first elongated guide bar has a tapered lower edge.

11. The apparatus of claim 9 wherein, said first elongated guide bar has a rectangular cross-section, and said second elongated guide bar has a round cross-section.

12. An apparatus for separating the portions of poultry wings, comprising:

a conveyor movable along a linear path between a first position and a second position displaced from said first position;

a guide block removably connected to said conveyor;

a drive assembly to propel said conveyor and said guide block through said linear path;

a non-rotating blade disposed within said linear path, wherein said blade includes, at least, an elongated, straight cutting edge upwardly oriented to engage a wing;

an overhead support frame disposed above, at least, a portion of said linear path;

a blade adjustment assembly adjustably connected to said overhead support frame wherein, said blade adjustment assembly includes, at least, a blade retaining assembly adjustably holding said blade and connected between said blade and said overhead support frame, and said blade is adjustably retained by said blade retaining assembly and adjustably depends from said blade adjustment assembly into said linear path, said blade being adjustable relative to said guide block, whereby the depth of penetration of said blade relative to said guide block is adjusted by repositioning said blade relative to said blade retaining assembly; and whereby a wing of a bird supported by said guide block is moved within said linear path into engagement with said blade to effect separation of the wing into wing portions.

13. The apparatus of claim 12 wherein, said blade adjustment assembly further includes, at least, a lateral member extending from said overhead support frame and adjustably connected to said blade, said blade is securably positionable relative to said lateral member, and said blade is adjustably positionable relative to said overhead support frame, whereby the horizontal location of said blade relative to said guide block is adjustable.

14. The apparatus of claim 13, wherein said lateral member includes, at least, a threaded post.

15. The apparatus of claim 13 wherein, said blade retaining assembly includes, at least, a sleeve partially enclosing a first portion of said blade and from which a second portion of said blade adjustably depends proximate to said guide block, and a retaining element protruding through said sleeve into releasable contact with said blade, said retaining element releasably retaining said first portion of said blade within said sleeve, and said blade is adjusted by sliding said first portion of said blade relative to said sleeve upon sufficient release of said blade retaining element, whereby the depth of penetration of said blade relative to said guide block is adjusted.

16. The apparatus of claim 15, wherein said blade adjustment assembly further includes, at least, a collar defining an opening through which said lateral member extends, said collar being repositionable along said lateral member, and an intermediate member connected between said collar and said sleeve.

17. An apparatus for separating the portions of poultry wings, comprising:

a conveyor movable along a linear path between a first position and a second position displaced from said first position;

a guide block removably connected to said conveyor;

a drive assembly to propel said conveyor and said guide block through said linear path;

a non-rotating first blade disposed within said linear path, said first blade including, at least, an elongated, straight cutting edge upwardly oriented to engage a wing;

an overhead support frame disposed above, at least, a portion of said linear path;

a blade adjustment assembly adjustably connected to said overhead support frame wherein, said blade adjustment assembly includes, at least, a blade retaining assembly adjustably holding said first blade and connected between said first blade and said overhead support frame, and said first blade is adjustably retained by said blade retaining assembly and adjustably depends from said blade adjustment assembly into said linear path, said first blade being adjustable relative to said guide block, whereby the depth of penetration of said first blade relative to said guide block is adjusted by repositioning said first blade relative to said blade retaining assembly; and a second blade adjustably disposed within said linear path both laterally and longitudinally displaced from said first blade;

whereby a wing of a bird supported by said guide block is moved within said linear path into engagement with said first blade and said second blade to effect separation of the wing into wing portions.

18. The apparatus of claim 17 wherein, said blade adjustment assembly further includes, at least, a lateral member extending from said overhead support frame and adjustably connected to said first blade, said first blade is securably positionable relative to said lateral member, and said first blade is adjustably positionable relative to said overhead support frame, whereby the horizontal location of said first blade relative to said guide block is adjustable.

19. The apparatus of claim 18, wherein said lateral member includes, at least, a threaded post.

20. The apparatus of claim 18 wherein, said blade retaining assembly includes, at least, a sleeve partially enclosing a first portion of said first blade and from which a second portion of said first blade adjustably depends proximate to said guide block, and a retaining element protruding through said sleeve into releasable contact with said first blade, said retaining element releasably retaining said first portion of said first blade within said sleeve, and said first blade is adjusted by sliding said first portion of said first blade relative to said sleeve upon sufficient release of said blade retaining element, whereby the depth of penetration of said first blade relative to said guide block is adjusted.

21. The apparatus of claim 20, wherein said blade adjustment assembly further includes, at least, a collar defining an opening through which said lateral member extends, said collar being repositionable along said lateral member, and an intermediate member connected between said collar and said sleeve, said intermediate member being attached to said sleeve.

22. The apparatus of claim 21 wherein, said blade adjustment assembly is a first blade adjustment assembly for adjusting the position of said first blade relative to said guide block, and said apparatus further includes, at least, a second blade adjustment assembly for adjusting the position of said second blade relative to said guide block.

23. The apparatus of claim 22, wherein said apparatus further includes, at least, an elongated guide bar adjustably suspended from said overhead support frame and extending within said linear path, said elongated guide bar being adjustable relative to said guide block, whereby restraining and positioning of different sizes of poultry wings is effected.

24. The apparatus of claim 23, wherein said apparatus further includes, at least, a guide bar hanger attached to said elongated guide bar and defining a slot, and a hanger mount attached to said overhead support frame and extending through said slot, whereby said elongated guide bar is adjustably suspended to said overhead support frame, and whereby the vertical position of said elongated guide bar is adjusted to accommodate different sizes of poultry wings by repositioning said slot of said guide bar hanger in relation to said hanger mount.

* * * * *